US012594563B2

(12) United States Patent
Bodet et al.

(10) Patent No.: US 12,594,563 B2
(45) Date of Patent: *Apr. 7, 2026

(54) TWO-PIECE NOZZLE FOR AEROSOL DISPENSERS

(71) Applicant: LINDAL FRANCE SAS, Val de Briey (FR)

(72) Inventors: Hervé Bodet, Verdun (FR); Bernard Borel, Moirans (FR)

(73) Assignee: LINDAL FRANCE SAS, Val de Briey (FR)

( * ) Notice: Subject to any disclaimer, the term of this patent is extended or adjusted under 35 U.S.C. 154(b) by 982 days.

This patent is subject to a terminal disclaimer.

(21) Appl. No.: 17/602,315

(22) PCT Filed: Apr. 10, 2019

(86) PCT No.: PCT/EP2019/059173

§ 371 (c)(1),
(2) Date: Oct. 8, 2021

(87) PCT Pub. No.: WO2020/207584

PCT Pub. Date: Oct. 15, 2020

(65) Prior Publication Data

US 2022/0184645 A1 Jun. 16, 2022

(51) Int. Cl.
*B05B 1/34* (2006.01)
*B65D 83/14* (2025.01)

(52) U.S. Cl.
CPC .......... *B05B 1/3447* (2013.01); *B65D 83/753* (2013.01)

(58) Field of Classification Search
CPC ..... B05B 1/3405; B05B 1/341; B05B 1/3415; B05B 1/3421; B05B 1/3426;
(Continued)

(56) References Cited

U.S. PATENT DOCUMENTS 2,674,493 A 4/1954 Raskin
3,129,893 A * 4/1964 Howard ................ B05B 1/3436 239/573

(Continued)

FOREIGN PATENT DOCUMENTS

CA 2062862 A1 4/1993
CN 204544496 U 8/2015

(Continued)

OTHER PUBLICATIONS

International Search Report and Written Opinion dated Nov. 20, 2019 in corresponding application No. PCT/EP2019/059173; w/ English partial translation and partial machine translation (total 20 pages).

(Continued)

*Primary Examiner* — Darren W Gorman
(74) *Attorney, Agent, or Firm* — Seckel IP, PLLC

(57) ABSTRACT

The two-piece nozzle for an aerosol dispenser has (i) an outer piece (12, 22) provided with a tubular wall (121, 221) open on one side and closed on the other by a front wall (122, 222), forming a cavity, the front wall being provided at its center with an outlet opening (123, 223), the outer piece having a certain symmetry about an axis of symmetry (A) and (ii) inner piece (11, 21) separate from the dispenser for which the nozzle is intended, the inner piece (11, 21) being dimensioned to penetrate into the cavity of the outer piece while being retained therein, the inner piece having a front face (111, 211) facing the front wall (122, 222) of the outer piece and a lateral face following the front face. Channels (112, 125, 224, 225) are made in the cavity of the outer piece (12, 22) and/or on the surface of the inner piece, which channels open into a turbulence chamber (127, 227) in communication with the outlet opening (123, 223), the outlet opening (123, 223) being placed in the flow path of the product flow downstream of the turbulence chamber. The
(Continued)

Figure 1:
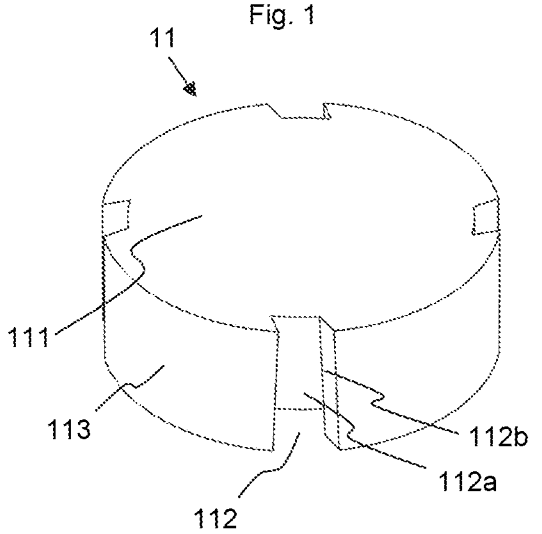

channels are divided into lateral channels (112, 224) in the lateral face of the inner piece (11, 21) and/or in the inner face of the tubular wall of the outer piece (12, 22), and into converging channels (125, 225) in the front wall (122, 222) of the outer piece or in the front face (111, 211) of the inner piece.

22 Claims, 4 Drawing Sheets

(58) Field of Classification Search
CPC ... B05B 1/3431; B05B 1/3436; B05B 1/3447; B65D 83/753
See application file for complete search history.

(56) References Cited

U.S. PATENT DOCUMENTS

| | | | | |
|---|---|---|---|---|
| 4,187,985 | A * | 2/1980 | Goth | B65D 83/20 239/491 |
| 4,260,110 | A | 4/1981 | Werding | |
| 4,650,094 | A * | 3/1987 | Werding | B65D 83/7535 239/533.1 |
| 6,152,384 | A * | 11/2000 | Lopez | B60S 1/52 239/492 |
| 6,241,165 | B1 | 6/2001 | Bickart et al. | |
| 6,415,994 | B1 | 7/2002 | Boggs | |
| 6,722,585 | B1 * | 4/2004 | Stradella | B05B 11/0072 239/602 |
| 9,527,092 | B2 | 12/2016 | Miyamoto et al. | |
| 10,000,330 | B2 * | 6/2018 | Szekely | B05B 1/3426 |
| 2007/0119872 | A1 * | 5/2007 | Parmentier | B65D 83/20 222/332 |
| 2008/0121738 | A1 * | 5/2008 | Togashi | B05B 1/3463 239/406 |
| 2009/0020568 | A1 | 1/2009 | Laidler et al. | |
| 2013/0068849 | A1 * | 3/2013 | Birkel | A61K 8/046 239/1 |
| 2013/0087638 | A1 | 4/2013 | Miyamoto et al. | |
| 2014/0217124 | A1 * | 8/2014 | Kim | B05B 11/1001 222/321.9 |
| 2016/0039596 | A1 | 2/2016 | Nelson et al. | |
| 2017/0225178 | A1 * | 8/2017 | Kim | B05B 1/341 |
| 2018/0338599 | A1 * | 11/2018 | Lim | B05B 11/1001 |
| 2021/0252529 | A1 * | 8/2021 | Kim | B05B 1/3436 |

FOREIGN PATENT DOCUMENTS

| | | | | |
|---|---|---|---|---|
| DE | 29802025 | U1 | 4/1998 | |
| EP | 0538543 | A1 | 4/1993 | |
| EP | 2570110 | A2 | 3/2013 | |
| EP | 2583756 | A1 | 4/2013 | |
| FR | 2772645 | A1 | 6/1999 | |
| FR | 2792552 | A1 | 10/2000 | |
| KR | 101022601 | B1 * | 3/2011 | B05B 1/341 |
| SU | 1026836 | A2 | 7/1983 | |
| WO | 03061839 | A1 | 7/2003 | |
| WO | 2006095153 | A1 | 9/2006 | |

OTHER PUBLICATIONS

International Search Report and Written Opinion dated Jan. 2, 2019 in application No. PCT/EP2018/078705 corresponding to prior U.S. Appl. No. 16/761,586, now U.S. Pat. No. 11,850,611; with English machine translation (total 23 pages).

EP Search Report and Written Opinion dated Oct. 12, 2020 in divisional application No. EP20176158 corresponding to prior U.S. Appl. No. 16/761,586, now U.S. Pat. No. 11,850,611; w/ English machine translation (total 13 pages).

* cited by examiner

TWO-PIECE NOZZLE FOR AEROSOL DISPENSERS

The invention concerns a two-piece nozzle for an aerosol dispenser.

Many products are applied as an aerosol. To spray a product contained in a generator of pressurized aerosol, a dispenser is placed at the outlet of the valve, the role of the dispenser being, on the one hand, to actuate the valve, and on the other hand, to direct the jet in a predefined direction. To this end, the dispenser is provided with a conduit leading from the stem of the valve to an outlet orifice. In order to obtain a spray with finely divided droplets and not a jet of liquid or drops, a nozzle is generally placed at the outlet of the conduit. This nozzle is traditionally made up of a tumbler-shaped insert provided in its bottom with a small central orifice and fitted on a tenon made in the dispenser, at the end of the conduit. The conduit of the dispenser ends in one or several longitudinal channels distributed over the circumference of the tenon. Another solution consists in placing, in a cavity made at the end of the conduit of the dispenser, a nozzle made up of two pieces, namely an inner piece performing the function of the tenon of the dispenser and an outer piece similar to the insert. The longitudinal channels are then placed either on the inner piece or on the outer piece. Such a two-piece nozzle is known, for example, from U.S. Pat. No. 9,527,092 B2. To improve the quality of the spray, convergent channels that open tangentially into a circular or annular turbulence chamber surrounding the outlet orifice are placed in the bottom of the insert or on the front face of the tenon or of the inner piece. The nozzle is then called a vortex nozzle (mechanical break-up or MBU). The determining factors for the quality of the spray are, among others, the geometry and distribution of the channels, the diameter of the outlet orifice, and the conical shape of the outlet orifice. However, the current injection techniques for the inserts do not make it possible to reliably obtain outlet orifices having diameters less than 0.2 mm.

Furthermore, mastering the fitting of the insert into the dispenser or the assembly of the two-piece nozzle is complex, and the quality of the spray depends strongly on the angular positioning of the insert on the tenon of the dispenser, or of the inner piece relative to the outer piece. To ensure that the longitudinal channels coincide with the converging channels when they are not made on the same piece, it is common to design the longitudinal channels with much larger angular sectors than those of the converging channels. Even if the insert or the outer piece is not exactly oriented with respect to the tenon or the inner piece, the converging channels are necessarily in the continuity of the longitudinal channels.

The objective of the invention is therefore to improve the two-piece nozzles of the state of the art.

This objective is achieved by a nozzle for an aerosol dispenser, in particular for a dispenser of pressurized aerosol, comprising

- an outer piece provided with a tubular wall open on one side and closed on the other by a front wall, forming a cavity, the front wall being provided in its center with an outlet opening, the outer piece having a certain symmetry about an axis of symmetry,
- an inner piece separate from the dispenser for which the nozzle is intended, which inner piece is dimensioned to penetrate into the cavity of the outer piece while being retained there, the inner piece having a front face facing the front wall of the outer piece and a lateral face following the front face,
- channels being made in the cavity of the outer piece and/or on the surface of the inner piece, which channels open into a central turbulence chamber in communication with the outlet opening, the outlet opening being placed in the flow path of the product flow downstream of the turbulence chamber.

According to the invention, the channels are divided into lateral channels made in the lateral face of the inner piece and/or in the inner face of the tubular wall of the outer piece, and into converging channels made in the front wall of the outer piece or in the front face of the inner piece. For a better effect, it is preferable that the transverse cross-section of the lateral channels decreases between the upstream end of the channels, located opposite to the front face or the front wall, and the downstream end of the channels, located on the side of the front face or the front wall. In particular, the lateral channels can have a bottom wall surrounded by two side walls, the side walls coming closer to each other in the direction of the front face of the inner piece or the front wall of the outer piece. It is also possible that the bottom wall comes closer to the inner face of the tubular wall of the outer piece, when the lateral channels are placed on the outer piece, or to the lateral face of the inner piece, when the lateral channels are placed on the inner piece.

In an alternative embodiment of the invention, the lateral channels have a bottom wall surrounded by two side walls, the intersection between each side wall and the bottom wall forming a non-right angle, the two walls being inclined relative to the bottom wall, preferably in the same direction, the two walls preferably being inclined at the same angle and/or the two walls preferably extending parallel to each other.

In a preferred variant embodiment, the front face of the inner piece does not have a protrusion, or the front face of the inner piece has a protrusion, the end of which does not penetrate into the outlet opening.

The cavity of the outer piece and the inner piece have preferably the shape of a cylinder of revolution or of a cone of revolution about the axis of symmetry. It is self-evident that it would also be possible to provide other shapes, in particular a cylinder or a cone with a polygonal base. Similarly, it would be possible for the front face of the inner piece and/or for the front wall of the outer piece to have a domed shape, for example, a hemispherical shape.

Depending on needs, the lateral channels can be substantially rectilinear and parallel to an axial plane passing through them and defined by a main axis passing through the center of the nozzle. In such a case, the length of the channels is the shortest. It is also possible that the channels are not rectilinear and diverge from an axial plane defined by the main axis passing through the center of the nozzle. In particular, the lateral channels can have a helical shape. This latter shape is particularly simple to produce on the inner piece. In such a case, the channels are longer. The modification of the length of the lateral channels makes it possible to adapt the flow rate of the flow of material. It is also possible, by tilting the lateral channels, at least at their junction with the converging channels, to orient the flow in a predetermined and optimized manner as it enters the converging channels, which contributes to perfecting the quality of the spray. Thus, it is possible to avoid angles, or at least angles which are too great, at the junction between the lateral channels and the converging channels, which converging channels are generally inclined relative to the radiant plane.

The converging channels can extend from the envelope that defines the lateral face of the inner piece or the inner face of the tubular wall of the outer piece toward the turbulence chamber into which they open preferably tangentially.

It is preferable that the inner piece has a rear face, preferably substantially planar, provided with a peripheral edge projecting in the direction opposite to the front face, one or more passages being made in the peripheral edge to bring in contact the inner face and the outer face of said peripheral edge. When the lateral channels are made in the lateral wall of the inner piece, the passages passing through the projecting edge preferably open into said lateral channels. This way, the product leaving the outlet channel of the dispenser can penetrate into the recess located inside the peripheral edge, pass through the passage or passages to reach the lateral channels of the inner piece or the outer piece.

It can be advantageous for the nozzle to be immobilized in the cavity, in particular to guarantee that the lateral channels align exactly with the converging channels. In this case, the nozzle can be provided with fixing means for fixing the inner piece in the cavity of the outer piece so that it is immobilized in the cavity. Another solution consists in dimensioning the inner piece so that it is retained by a tight fit in the cavity of the outer piece so as to be immobilized there. To facilitate assembly of the inner piece in the outer piece, the inner piece and/or the outer piece can be provided with first orientation means for orienting the inner piece relative to the outer piece in order to align the channels with one another. Another solution consists in orienting the inner piece before transferring it into the cavity of the outer piece.

Conversely, in other cases, it can be advantageous to provide the inner piece mobile in rotation in the outer piece. In this case, the nozzle can be provided with retaining means for retaining the inner piece in the cavity of the outer piece so that it is mobile in rotation in the cavity about the axis of symmetry.

In a preferred embodiment of the invention,

- the lateral channels are placed on the lateral face of the inner piece, the transverse cross-section of the lateral channels decreasing from the upstream end, located opposite to the front face, and the downstream end, located on the side of the front face, the lateral channels being provided with a bottom wall surrounded by two side walls which each form a non-right angle with the bottom wall, the two side walls preferably extending parallel to each other;
- the converging channels are placed on the front wall of the outer piece;
- the front face of the inner piece does not have a protrusion, or has a protrusion whose end opposite to the front face does not penetrate into the outlet opening of the front wall of the outer piece;
- the inner piece preferably being dimensioned to be retained by a tight fit in the cavity of the outer piece so as to be immobilized therein.

When the nozzle is to be used with two-way valves, it can be provided that the conduit of the dispenser extends the separation of the two paths until its outlet end, and that a portion of the channels of the nozzle is intended for one of the paths and the rest of the channels for the other path. In this case, it is preferable to provide the nozzle with second orientation means for orienting the nozzle relative to the dispenser for which it is intended. Another solution consists in separating sufficiently the channels from one another, or in giving them a sufficiently small angular deployment, so that a same conduit cannot be simultaneously in contact with the two paths.

It is possible to provide a rear wall of the inner piece with divergent channels, which preferably open into the lateral channels.

The nozzle of the invention can be sold alone, or it can be mounted in a housing of an aerosol dispenser, wherein the housing can have a bottom face provided with divergent channels.

Figure 2:
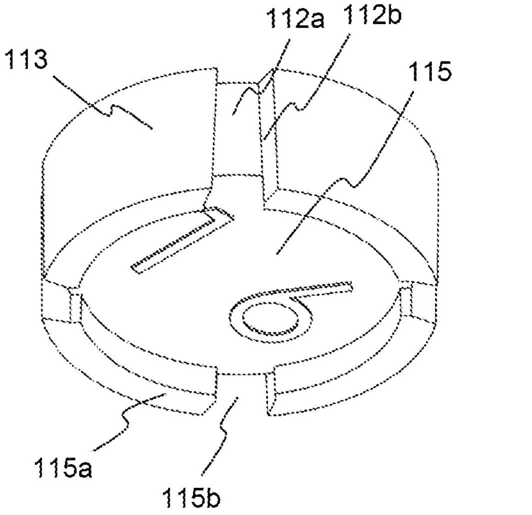
Figure 3:
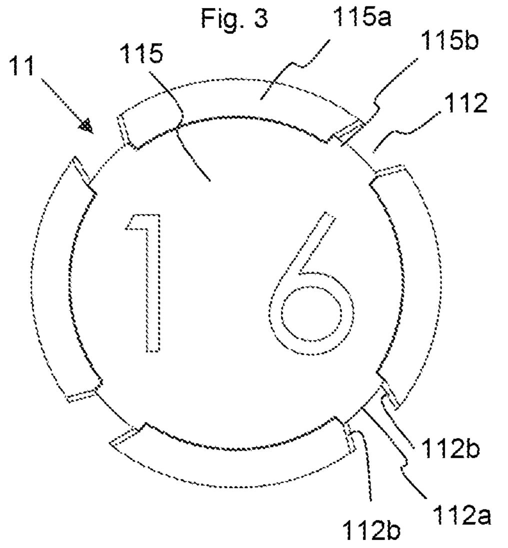
Figure 4:
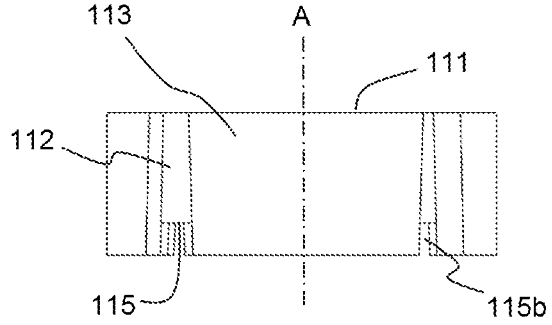
Figure 5:
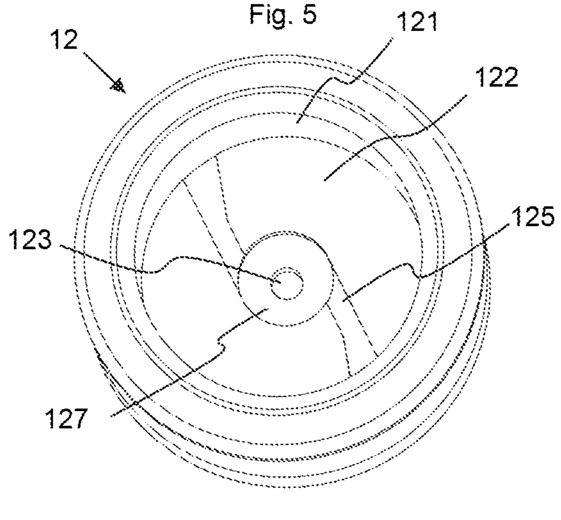
Figure 6:
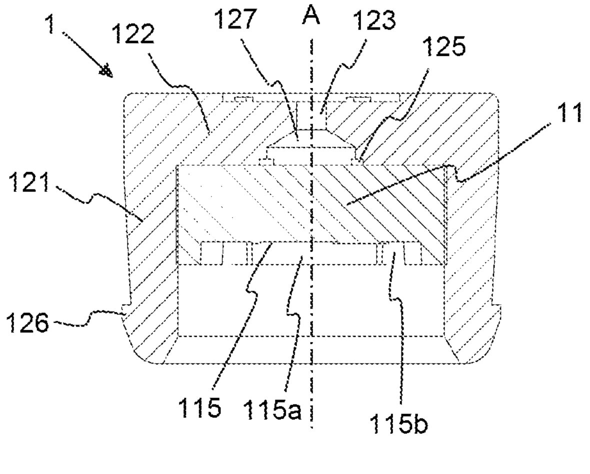
Figure 7:
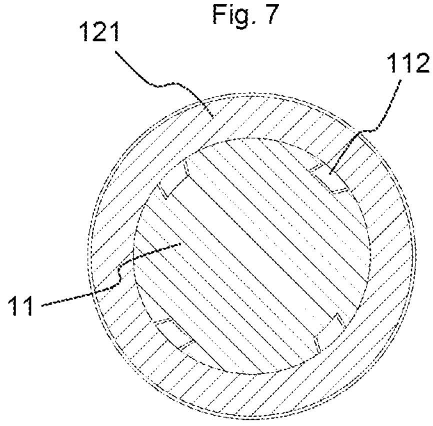
Figure 9:
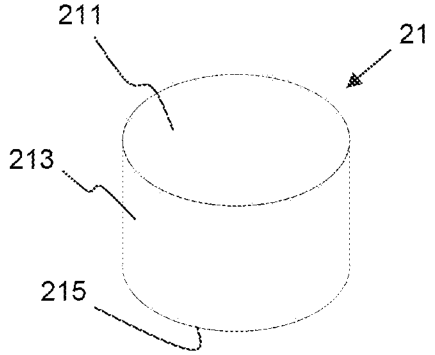
Figure 8:
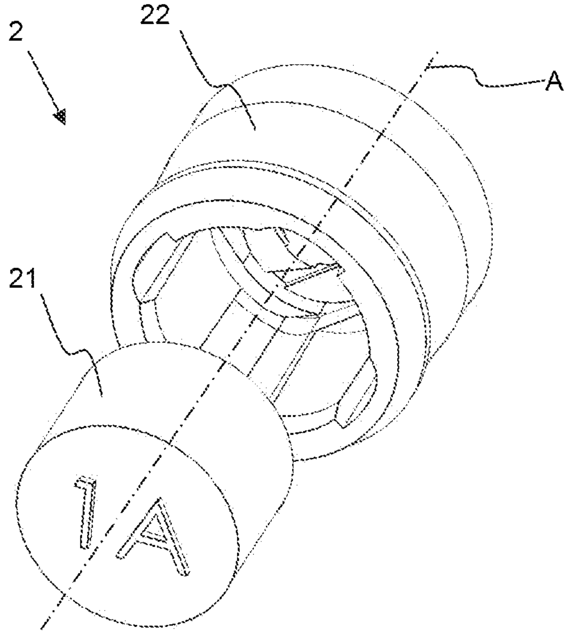
Figure 10:
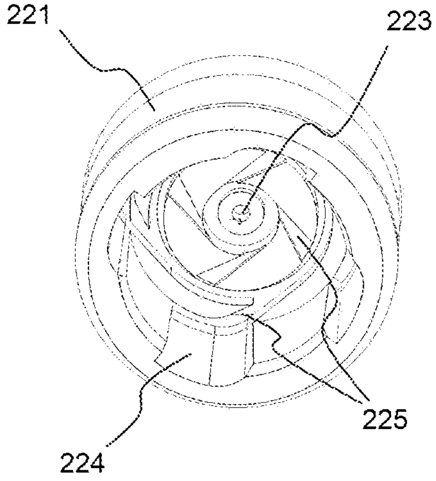
Figure 11:
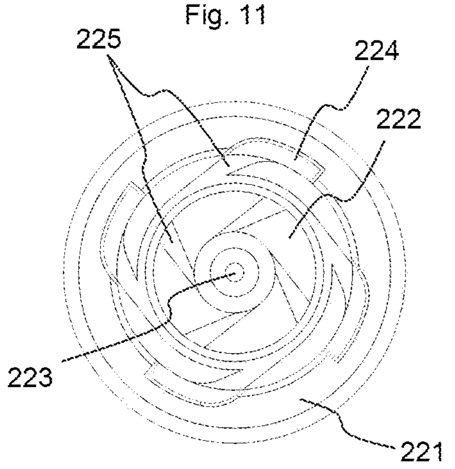
Figure 12:
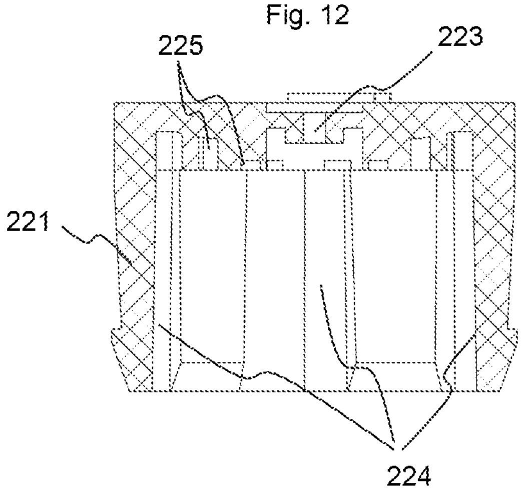
Figure 13:
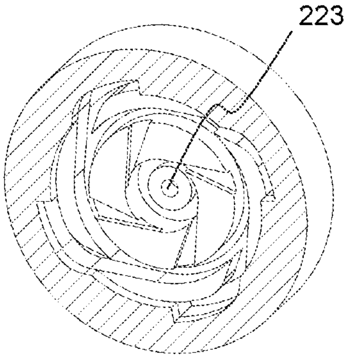
Figure 14:
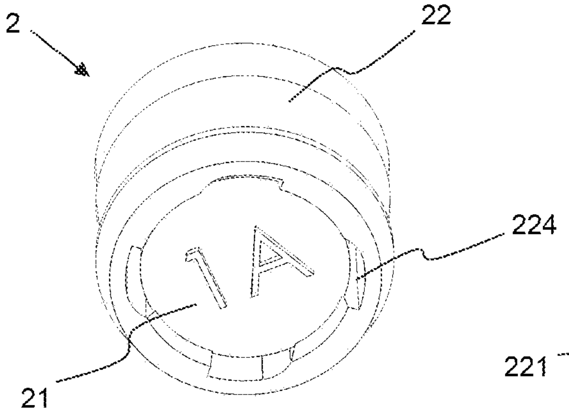
Figure 15:
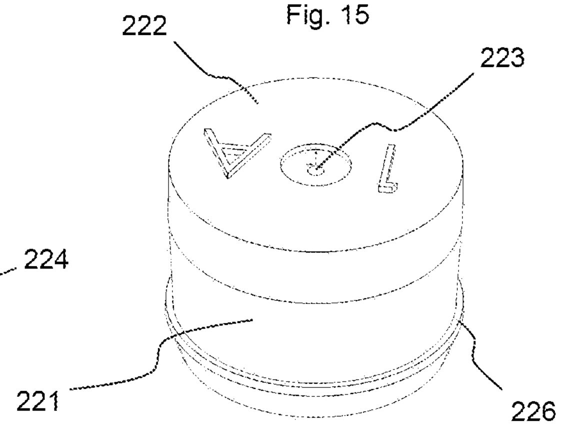
Figure 16:
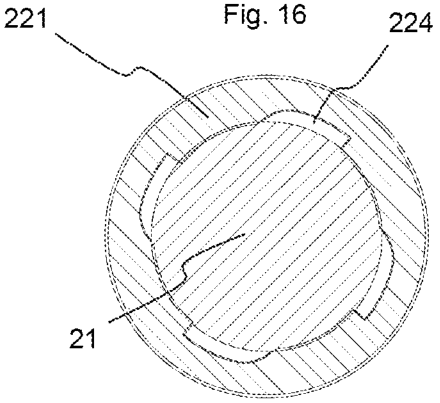
Figure 17:
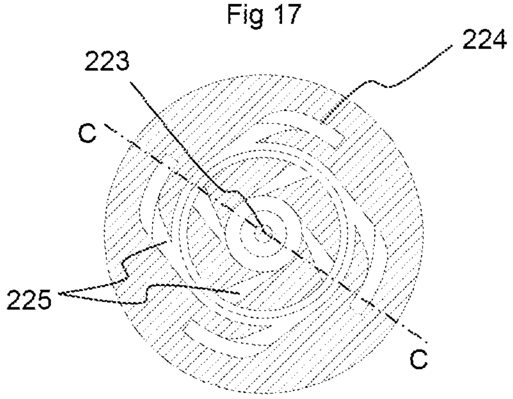
Figure 18:
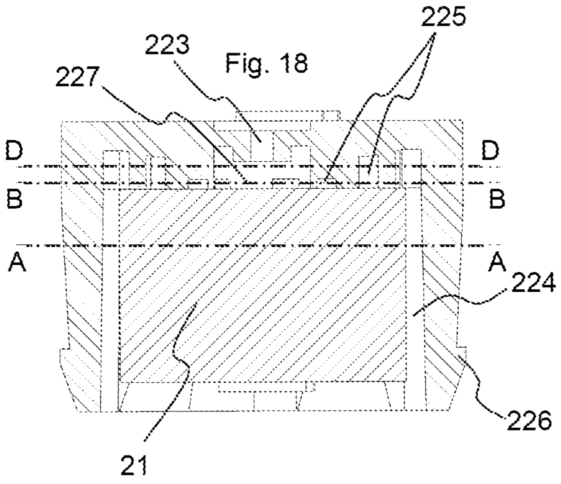
Figure 19:
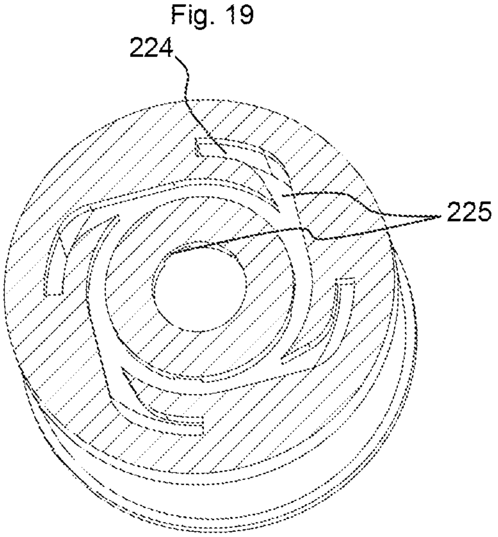
Figure 20:
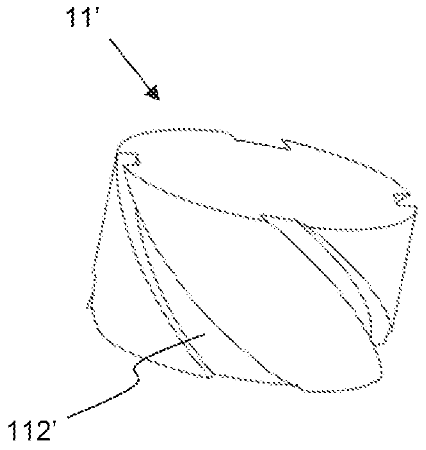

The invention is described in more detail below with the aid of two embodiments presented in the following figures, which show:

FIG. 1 a perspective view from above of the inner piece of a first nozzle according to the invention;

FIG. 2 a perspective view from below of the inner piece of FIG. 1;

FIG. 3 a bottom view of the inner piece of FIG. 1;

FIG. 4 a side view of the inner piece of FIG. 1;

FIG. 5 a perspective view from below of the outer piece of the 1st nozzle;

FIG. 6 an axial cross-section view of the 1st nozzle;

FIG. 7 a radial cross-section view of the 1st nozzle;

FIG. 8 an exploded view of a second nozzle according to the invention;

FIG. 9 a perspective view of the inner piece of the 2nd nozzle;

FIG. 10 a perspective view from below of the outer piece of the 2nd nozzle;

FIG. 11 a bottom view of the outer piece of the 2nd nozzle;

FIG. 12 an axial cross-section view of the outer piece of the 2nd nozzle;

FIG. 13 a horizontal cross-section in perspective of the outer piece along the plane AA of FIG. 18;

FIG. 14 a perspective view from below of the 2nd nozzle;

FIG. 15 a perspective view from above of the 2nd nozzle;

FIG. 16 a horizontal cross-section of the 2nd nozzle along the plane AA of FIG. 18;

FIG. 17 a horizontal cross-section of the 2nd nozzle along the plane BB of FIG. 18;

FIG. 18 a vertical cross-section of the 2nd nozzle along the plane CC of FIG. 17;

FIG. 19 a cross-section in perspective of the 2nd nozzle along the plane DD of FIG. 18;

FIG. 20 a perspective view of a variant of the inner piece for the first nozzle;

The invention concerns a nozzle (1, 2) for an aerosol dispenser intended to be placed on a valve of a pressurized container. The nozzle can be used with an aerosol dispenser cooperating with a container which is not pressurized. The nozzle is constituted by an inner piece (11, 21) and an outer piece (12, 22). Two examples of nozzles are shown in the figures. The constituent elements of variants are indicated by a sign "'".

The nozzle and its components have a certain rotational symmetry about a main axis (A) passing through the nozzle parallel to the general direction of diffusion of the product. It will be seen that this rotational symmetry is not absolute, and some parts of the nozzle deviate from it. The adjectives "axial" or "radial" refer to this main axis and define an element parallel to the axis or perpendicular to this axis, respectively. To simplify the description, the spatial references such as "upper" and "lower", "above" or "below" refer to the nozzle and its components as shown on in FIG. 6 or FIG. 18, for example. It is not an absolute position, but only a reference position for the description, and the nozzle integrated in a dispenser can be used in any position suitable for the product to be delivered.

The outer piece (12, 22) has the general shape of a tumbler formed by a tubular wall (121, 221) open on one side and closed on the other by a front wall (122, 222). The cavity defined by the tubular wall and the front wall has a general shape of a cylinder of revolution or of a cone of revolution. An outlet opening (123, 223) is made in the center of the front wall to bring the cavity in contact with the outer face of the front wall.

The inner piece (11, 21) has the general shape of a cylinder of revolution or of a cone of revolution substantially complementary to that of the cavity of the outer piece. It has a front face (111, 211) which, in the assembled state of the nozzle, faces the front wall (122, 222) of the outer piece, generally while being in partial contact with it. The front face (111, 211) does not have a protrusion. It is preferably smooth or substantially smooth. A protrusion could be provided, but this protrusion does not penetrate into the outlet (123, 223).

The inner piece has a substantially planar rear face (115, 215). It can be provided with a peripheral edge (115*a*) projecting in the direction opposite to the front face (111). In this case, one or more passages (115*b*) can be provided in the peripheral edge to bring in contact the inner face and the outer face of said peripheral edge. These passages (115*b*) open into the lateral channels (112) when said lateral channels are made in the lateral wall of the inner piece. This is the case with the 1st nozzle, as is clearly visible in particular in FIG. 2.

Channels are made in the inner piece and/or in the outer piece to bring the product to be dispensed coming from the valve to the outlet opening (123, 223) of the nozzle. These channels are divided into two portions: lateral channels (112, 112', 224) leading from the inlet of the nozzle to the front wall and converging channels (125, 225) leading from the end of the lateral channels (112, 224) to a turbulence chamber (127, 227) from which the outlet opening (123, 223) starts. The lateral channels can be made on the cylindrical or frustoconical wall of the inner piece (11), as in the first nozzle, or on the inner face of the tubular wall (221) of the outer piece, as in the second nozzle. In the examples presented here, the converging channels (125, 225) are made in the bottom of the tumbler, on the inner face of the front wall (122, 222) of the outer piece. However, it would be possible to make them on the front face (111, 211) of the inner piece (11, 21).

The converging channels are used to form the spray. These channels start from the peripheral edge of the front wall (122, 222) of the cavity of the outer piece or of the front face (111, 211) of the inner piece, and open tangentially, or at least non-radially, into a circular cavity, so that when the two pieces are assembled, a turbulence chamber (127, 227) is formed, which facilitates formation of the spray. This process is known as "mechanical break-up".

The outlet opening (223, 223') is always located downstream of the central turbulence chamber (227, 227') and, when placing oneself on the axis of symmetry (A), behind the turbulence chamber in the direction of the product flow, but it does not necessarily start closer to the outer face of the front wall (222) than certain portions of the converging channels. In other words, the lower portion of the outlet opening can be surrounded by at least a portion of the converging channels, although these converging channels do not open into this outlet opening. This is clearly visible, for example, on the cross-section of FIG. 18.

The lateral channels (112, 224) can be vertical, as in the exemplary embodiments presented in FIG. 1 and FIG. 8. In other words, the channels are rectilinear and extend parallel to an axial plane passing through them and defined by the axis of symmetry (A). They define the shortest path between the nozzle inlet and the converging channels. It is also possible to make them according to a geometry that deviates from the vertical. For example, they can have an helical shape as in FIG. 20, or even a zigzag shape. In this case, the lateral channels (112') do not extend parallel to an axial plane defined by the axis of symmetry (A), but diverge from this axial plane. This allows the channels to be lengthened while keeping the same height for the nozzle. In general, the shorter the channel, the greater the flow. By shifting the lateral channels away from the vertical, their length is increased, which makes it possible to adapt the flow rate to specific needs while retaining the same size for the nozzle. Moreover, it is possible to tilt the flow of product, at least at the junction with the converging channels, which allows the flow to penetrate into these converging channels in an optimal manner.

In the example of the 1st nozzle, the lateral channels are placed on the inner piece (11). The transverse cross-section of these lateral channels decreases slightly between the inlet located at the bottom face (115) and the outlet located at the front face (111).

The lateral channels (112, 112', 224) can have a bottom wall (112*a*) surrounded by two side walls (112*b*). To reduce the transverse cross-section of the lateral channels, it is possible for example to bring the side walls (112*b*) closer to each other in the direction of the front wall (122, 222) or the front face (111, 211). In other words, the closer to the lower face (115), the more apart the side walls are from each other, while the closer to the front face (111), the closer they are to each other. This is clearly visible in FIGS. 3 and 4. In an alternative or complementary variant, it is the bottom wall (112*a*) that comes progressively closer to the surface in which it is made. In other words, the closer to the front face, the closer the bottom wall comes to the lateral face (113, 223) and the less the channel is deep.

The two side walls (112*b*) of the lateral channels can be inclined relative to the bottom wall (112*a*), preferably in the same direction, generally at the same angle. This is clearly visible in FIG. 3 in particular. It would also be possible that the two side walls (112*b*) extend parallel to each other.

Regarding the lateral channels (224) of the 2nd nozzle, they are placed on the inner face of the tubular wall (221) of the outer piece. They also have a transverse cross-section that decreases due to a slight inclination of the side walls and of the bottom wall of the channels. In other words, the closer the lateral channels come to the front wall (122, 222), the closer the side walls come to each other. Another solution, alternative or complementary, can provide that the more the lateral channels come closer to the front wall (122, 222), the more the bottom wall (112*a*) comes closer to the inner face of the tubular wall (121, 221) of the outer piece.

The intersection between each side wall and the bottom wall of the lateral channels can form a non-right angle, the two walls being inclined relative to the bottom wall preferably in the same direction, the two walls preferably being inclined according to the same angle. It would also be possible for the two walls to extend parallel to each other.

One of the side walls of the lateral channels is rounded and is located in the extension of the side wall of the converging channels. This rounded shape of the side wall helps guide the flow into the corresponding converging channel. The second side wall of the lateral channels is straight and substantially radial.

The converging channels can be placed in the front wall of the cavity of the outer piece or on the front face of the inner piece.

In the example of the 2nd nozzle, there are two sets of converging channels. The converging channels of the first set start from the lateral channels and open radially into a first annular cavity, from which the channels of the second set start, and these channels of the second set open radially into a second circular or annular cavity that forms the turbulence chamber (227), and from which the outlet opening (223) starts.

When the lateral channels and the converging channels are not made in the same piece, preferably, the inner piece (11) is oriented properly relative to the outer piece (12) and retains this orientation during the entire use of the dispenser carrying the nozzle, so as to ensure proper operation of the nozzle and to make it possible to limit the transverse cross-section of the lateral channels (112) at their junction with converging channels. For this purpose, it is possible to provide first orientation means, such as foolproof devices or orientation marks. Another solution is to orient the inner piece correctly before introducing it into the outer piece. Further, to maintain the proper orientation of the inner piece in the outer piece during the entire life of the dispenser, the inner piece (11) can be slightly oversized relative to the cavity of the outer piece (12), so that it is introduced by force and kept in the correct position by a tight fit. Thanks to this good orientation of the two parts, it is possible to limit the transverse cross-section of the lateral channels (112), since it is certain that they will open exactly into the inlet of the converging channels (125). It is self-evident that in the second nozzle also, the inner piece (21) can be blocked in the cavity of the outer piece (22), either by orientation means or by tight fitting or force fitting, although the question of the alignment of the lateral channels and the converging channels does not arise.

When the lateral channels and the converging channels are placed on the same piece, on the outer piece (22) in the case of the second nozzle, the question of orientation does not arise. It is then possible to provide that the inner piece (21) is held in the cavity of the outer piece (22) while being mobile in rotation about the main axis (A). In this case, it is possible to provide retaining means, for example a latching system, which prevents the inner piece from coming out of the cavity without preventing it from rotating. This solution can promote vibration of the nozzle and create a resonance phenomenon in the flow, which further improves the quality of the spray.

In an alternative embodiment of the invention, the nozzle is used in a dispenser for two-way valve. In this case, the conduit of the dispenser is designed to maintain the separation of the paths between the outlet of the stem of the valve and the nozzle. The first path of the valve is brought in contact with a portion of the lateral channels and the second path with the rest of the lateral channels. In this case, mixing of the products takes place in the turbulence chamber. The nozzle must therefore be oriented correctly in the dispenser. This can be done, either by keeping the initial orientation of the nozzle, for example, by keeping it in its molding cavity until the moment of its installation in the dispenser, or by providing orientation means such as foolproof devices. Another solution consists in distributing the inlets of the lateral channels and/or their angular extent so that, whatever the position of the nozzle, the same lateral channel cannot be in contact simultaneously with the first path and with the second path.

In addition, it is possible to provide, on the rear face (115, 215) of the inner piece (11, 21), which face is opposite the front face (111, 211), one or more divergent channels, which are identical to or different from the converging channels.

The outer piece (12, 22) is preferably made of polyacetal such as POM. It can also be made of polyamide or semi-crystalline polyester such as PBT. The inner piece (11, 21) is preferably made of polyacetal such as POM. It can also be made of polyamide or semi-crystalline polyester such as PBT. These materials have the advantage that they are fluid and allow molding of precision parts with good geometric and dimensional stability. In addition, they are rigid, which makes it possible to provide proper anchoring of the nozzle in the dispenser via the anchoring means (126, 226), which grip onto the softer PP-type material of the dispenser. In addition, in the event that sterilization by ionizing radiation is required for the dispenser equipped with its nozzle, the PBT will behave better than POM or certain PAs.

The nozzle of the invention is placed in a housing provided directly at the outlet of the conduit. Anchoring means (126, 226) ensure secure attachment of the nozzle at the outlet of the conduit of the dispenser. The nozzle retained in this manner cannot be ejected, even when the pressure prevailing inside the conduit is high and the valve is open. If necessary, the bottom of the housing can have divergent channels that open into the lateral channels of the nozzle.

The examples presented here are not limiting. In particular, the following variants can be envisioned, depending on needs:

- The cavity of the outer piece (12, 22) and the inner piece (11, 21) can have the shape of a cylinder or of a cone, not of revolution, but with a polygonal base. In particular, a polygonal base having the same number of sides as there are lateral channels can be provided.
- The front wall (12, 22) of the outer piece and the front face (111, 211) of the inner piece are substantially radial in the examples presented here. They could be given another shape, for example, conical or domed, for example, hemispherical.
- The number of lateral channels and converging channels is generally two or four.

Other configurations can however be envisaged.

It is self-evident that the following characteristics can be used independently of one another and that it would be possible to provide nozzles having one or more of these characteristics:

- lateral channels that are non-vertical, i.e., that diverge from the axial plane, for example, helical channels;
- inner piece free in rotation in the outer piece.

By choosing a two-piece structure, it is possible to give any kind of shape to the channels, in particular to the lateral channels, and to adjust their lengths, for a same given size of the inner piece.

LIST OF REFERENCES

| | |
|---|---|
| 1 1st nozzle | 2 2nd nozzle |
| 11 Inner piece | 21 Inner piece |
| 111 Front face | 211 Front face |
| 112 Lateral channels | |
| 112a Bottom wall | |
| 112b Sidewalls | |
| 113 Lateral Face | 213 Lateral Face |
| 115 Rear face | 215 Rear face |
| 115a Peripheral edge | |
| 115b Passages | |

-continued

| | |
|---|---|
| 12 Outer piece | 22 Outer piece |
| 121 Tubular wall | 221 Tubular wall |
| 122 Front wall | 222 Front wall |
| 123 Outlet opening | 223 Outlet opening |
| | 224 Lateral channels |
| 125 Converging channels | 225 Converging channels |
| 126 Anchoring means | 226 Anchoring means |
| 127 Turbulence chamber | 227 Turbulence chamber |

The invention claimed is:

1. A two-piece nozzle for an aerosol dispenser, comprising:

an outer piece provided with a tubular wall open on one side and closed on another side by a front wall, forming a cavity, the front wall being provided at a center thereof with an outlet opening, the outer piece having a symmetry about an axis of symmetry, and an inner piece separate from the dispenser for which the nozzle is intended, the inner piece being dimensioned to penetrate into the cavity of the outer piece while being retained therein, the inner piece having a front face facing the front wall of the outer piece and a lateral face extending from a rear face of the inner piece to the front face, wherein channels are made in the cavity of the outer piece, on a surface of the inner piece, or both in the cavity of the outer piece and on a surface of the inner piece, the channels opening into a turbulence chamber in communication with the outlet opening, the outlet opening being placed in the flow path of the product flow downstream of the turbulence chamber, wherein the channels are divided into lateral channels made in the lateral face of the inner piece, in an inner face of the tubular wall of the outer piece, or both in the lateral face of the inner piece and in the inner face of the tubular wall of the outer piece, the lateral channels extending from the rear face to the front face of the inner piece, and into converging channels made in the front wall of the outer piece, in the front face of the inner piece, or both in the front wall of the outer piece and in the front face of the inner piece, the converging channels being in a fluid continuity of the lateral channels, wherein the transverse cross-section of the lateral channels decreases between an upstream end of the channels, located opposite to the front face or the front wall, and a downstream end of the channels, located on a side of the front face or the front wall.

2. The nozzle according to claim 1, wherein the lateral channels have a bottom wall surrounded by two side walls, and wherein the closer the lateral channels come to the front wall or the front face, the closer the side walls come to each other, the closer the bottom wall comes to the inner face of the tubular wall of the outer piece, or the closer the side walls come to each other and the bottom wall comes to the inner face of the tubular wall, when the lateral channels are placed on the outer piece, or to the lateral face of the inner piece, when the lateral channels are placed on the inner piece.

3. The nozzle according to claim 1, wherein the lateral channels have a bottom wall surrounded by two side walls, an intersection between each of the side walls and the bottom wall forming a non-right angle, the two side walls being inclined relative to the bottom wall.

4. The nozzle according to claim 1, wherein the front face of the inner piece is free of protrusion, or wherein the front face of the inner piece has a protrusion, an end of which does not penetrate into the outlet opening.

5. The nozzle according to claim 1, wherein the cavity of the outer piece and the inner piece have a shape of a cylinder of revolution or of a cone of revolution about the axis of symmetry.

6. The nozzle according to claim 1, wherein the lateral channels are substantially rectilinear and parallel to an axial plane passing through the lateral channels and defined by a main axis passing through the center of the nozzle.

7. The nozzle according to claim 1, wherein the lateral channels are not rectilinear and diverge from an axial plane defined by a main axis passing through the center of the nozzle.

8. The nozzle according to claim 1, wherein the converging channels extend from an envelope that defines the lateral face of the inner piece or the inner face of the tubular wall of the outer piece toward the turbulence chamber into which they open.

9. The nozzle according to claim 1, wherein the inner piece has a substantially planar rear face provided with a peripheral edge projecting in a direction opposite to the front face, one or more passages being made in the peripheral edge to bring in contact an inner face and an outer face of the peripheral edge, wherein the passages open into the lateral channels when the lateral channels are made in the side wall of the inner piece.

10. The nozzle according to claim 1, wherein the inner piece is dimensioned to be retained by a tight fit in the cavity of the outer piece so as to be immobilized therein.

11. The nozzle according to claim 1, wherein at least one selected from the group consisting of the inner piece, the outer piece, or both the inner piece and the outer piece are provided with first orientation means for orienting the inner piece relative to the outer piece in order to align the channels with one another, the nozzle is provided with second orientation means for orienting the nozzle relative to the dispenser for which the nozzle is intended.

12. The nozzle according to claim 1, wherein the lateral channels are placed on the lateral face of the inner piece, a transverse cross-section of the lateral channels decreasing between an upstream end, located opposite to the front face, and a downstream end, located on a side of the front face, the lateral channels being provided with a bottom wall surrounded by two side walls which each form a non-right angle with the bottom wall;

the converging channels are placed on the front wall of the outer piece; and the front face of the inner piece is free of protrusion, or has a protrusion whose end opposite to the front face does not penetrate into the outlet opening of the front wall of the outer piece.

13. The nozzle according to claim 1, wherein the rear face of the inner piece is provided with divergent channels.

14. The nozzle according to claim 1, wherein the nozzle is mounted in a housing of an aerosol dispenser.

15. The nozzle according to claim 3, wherein the two side walls are inclined relative to the bottom wall in the same direction.

16. The nozzle according to claim 3, wherein the two side walls are inclined at the same angle, the two side walls extend parallel to each other, or the two side walls are inclined at the same angle and extend parallel to each other.

17. The nozzle according to claim 7, wherein the lateral channels have a helical shape.

18. The nozzle according to claim 8, wherein the converging channels open into the turbulence chamber tangentially.

19. The nozzle according to claim 12, wherein the inner piece is dimensioned to be retained by a tight fit in the cavity of the outer piece so as to be immobilized therein.

20. A two-piece nozzle for an aerosol dispenser, comprising:

an outer piece provided with a tubular wall open on one side and closed on another side by a front wall, forming a cavity, the front wall being provided at a center thereof with an outlet opening, the outer piece having a symmetry about an axis of symmetry, and an inner piece separate from the dispenser for which the nozzle is intended, the inner piece being dimensioned to penetrate into the cavity of the outer piece while being retained therein, the inner piece having a front face facing the front wall of the outer piece and a lateral face extending from a rear face of the inner piece to the front face, wherein channels are made in the cavity of the outer piece, on a surface of the inner piece, or both in the cavity of the outer piece and on a surface of the inner piece, the channels opening into a turbulence chamber in communication with the outlet opening, the outlet opening being placed in the flow path of the product flow downstream of the turbulence chamber, wherein the channels are divided into lateral channels made in the lateral face of the inner piece, in an inner face of the tubular wall of the outer piece, or both in the lateral face of the inner piece and in the inner face of the tubular wall of the outer piece, the lateral channels extending from the rear face to the front face of the inner piece, and into converging channels made in the front wall of the outer piece, in the front face of the inner piece, or both in the front wall of the outer piece and in the front face of the inner piece, the converging channels being in a fluid continuity of the lateral channels, wherein the inner piece has a substantially planar rear face provided with a peripheral edge projecting in a direction opposite to the front face, one or more passages being made in the peripheral edge to bring in contact an inner face and an outer face of the peripheral edge, wherein the passages open into the lateral channels when the lateral channels are made in the side wall of the inner piece.

21. A two-piece nozzle for an aerosol dispenser, comprising:

an outer piece provided with a tubular wall open on one side and closed on another side by a front wall, forming a cavity, the front wall being provided at a center thereof with an outlet opening, the outer piece having a symmetry about an axis of symmetry, and an inner piece separate from the dispenser for which the nozzle is intended, the inner piece being dimensioned to penetrate into the cavity of the outer piece while being retained therein, the inner piece having a front face facing the front wall of the outer piece and a lateral face extending from a rear face of the inner piece to the front face, wherein channels are made in the cavity of the outer piece, on a surface of the inner piece, or both in the cavity of the outer piece and on a surface of the inner piece, the channels opening into a turbulence chamber in communication with the outlet opening, the outlet opening being placed in the flow path of the product flow downstream of the turbulence chamber, wherein the channels are divided into lateral channels made in the lateral face of the inner piece, in an inner face of the tubular wall of the outer piece, or both in the lateral face of the inner piece and in the inner face of the tubular wall of the outer piece, the lateral channels extending from the rear face to the front face of the inner piece, and into converging channels made in the front wall of the outer piece, in the front face of the inner piece, or both in the front wall of the outer piece and in the front face of the inner piece, the converging channels being in a fluid continuity of the lateral channels, wherein the lateral channels are placed on the lateral face of the inner piece, a transverse cross-section of the lateral channels decreasing between an upstream end, located opposite to the front face, and a downstream end, located on a side of the front face, the lateral channels being provided with a bottom wall surrounded by two side walls which each form a non-right angle with the bottom wall;

the converging channels are placed on the front wall of the outer piece; and the front face of the inner piece is free of protrusion, or has a protrusion whose end opposite to the front face does not penetrate into the outlet opening of the front wall of the outer piece.

22. The nozzle according to claim 21, wherein the inner piece is dimensioned to be retained by a tight fit in the cavity of the outer piece so as to be immobilized therein.

* * * * *